United States Patent [19]
Richter

[11] Patent Number: 4,957,791
[45] Date of Patent: Sep. 18, 1990

[54] PACKING SLEEVE

[75] Inventor: Alfred H. Richter, Arcadia, Calif.

[73] Assignee: Richter Manufacturing Corporation, Pomona, Calif.

[21] Appl. No.: 251,505

[22] Filed: Sep. 29, 1988

[51] Int. Cl.[5] .......................... B65D 33/01; B32B 3/10

[52] U.S. Cl. .................................... 428/35.5; 383/103; 428/136; 428/339

[58] Field of Search ....................... 428/35.5, 136, 339; 383/103

[56] References Cited

U.S. PATENT DOCUMENTS

| | | | |
|---|---|---|---|
| 2,235,981 | 3/1941 | Coe et al. | 383/103 |
| 3,040,966 | 6/1962 | Crane | 383/103 |
| 3,044,918 | 7/1962 | Wagner | 428/135 |
| 3,245,606 | 4/1966 | Crane | 383/103 |
| 3,392,080 | 7/1968 | Mercer | 428/134 |
| 3,407,111 | 10/1968 | Reilly | 428/483 |
| 3,494,457 | 2/1970 | Titchenal | 383/103 |
| 3,495,764 | 2/1970 | Crane | 383/103 |
| 3,642,967 | 2/1972 | Doll | 156/79 |
| 3,655,501 | 4/1972 | Tesch | 428/136 |
| 3,781,183 | 12/1973 | Doll | 156/79 |
| 4,503,561 | 3/1985 | Bruno | 383/103 |

OTHER PUBLICATIONS

Advertisement for Sealed Air Corp. (Converting Magazine, Nov. 1986).
Technical Bulletin No. 715-34 Cellu-Cushio Polyethylene Foam.

*Primary Examiner*—Ellis P. Robinson
*Assistant Examiner*—James J. Seidleck
*Attorney, Agent, or Firm*—Sheldon & Mak

[57] ABSTRACT

An expandable packing sleeve comprised of a thermoplastic material having rows of longitudinally disposed slits is provided wherein the rows of slits terminate spaced apart from a retaining end of the packing sleeve so that the retaining end is substantially non-expandable.

15 Claims, 5 Drawing Sheets

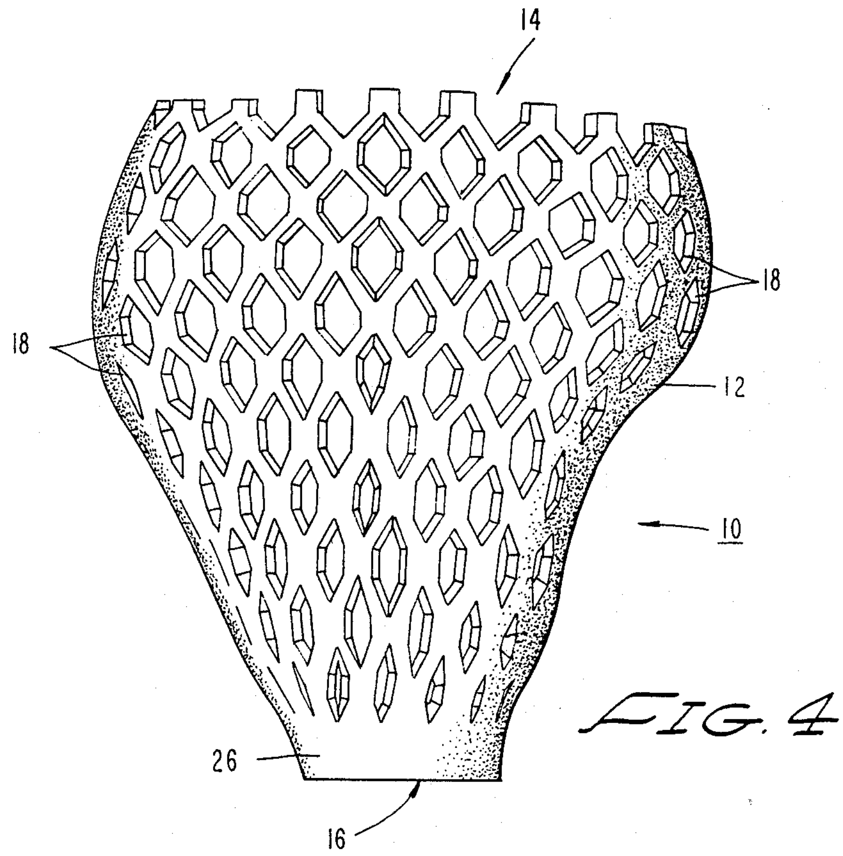
FIG. 4
FIG. 3
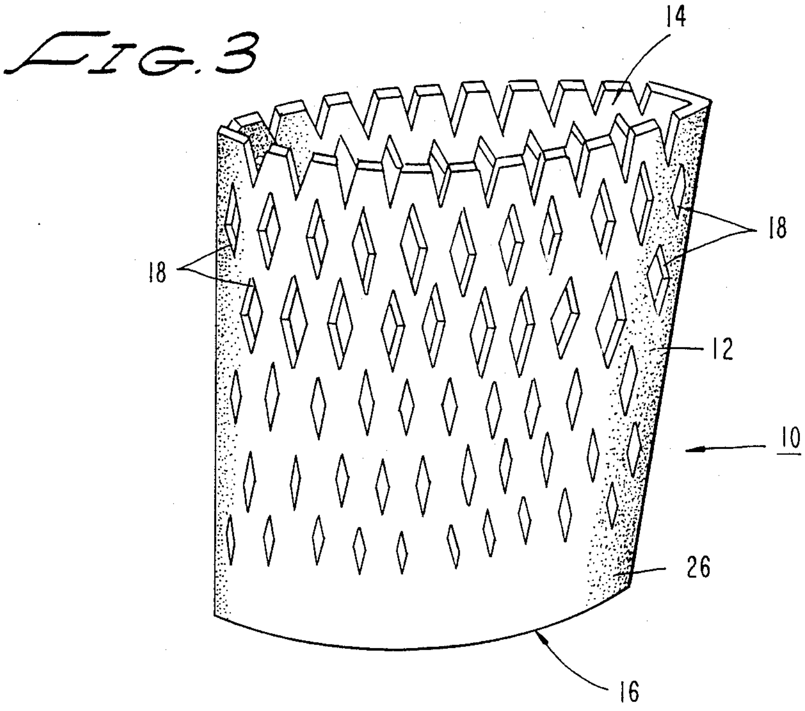

PACKING SLEEVE

BACKGROUND

This invention relates generally to porous packing items useful for packing produce The invention relates specifically to packing sleeves composed of an expandable sheet material.

Packing sleeves composed of a thin, translucent non-porous material, such as a plastic, are known to be useful in the packaging of fruit and vegetable items.

A particularly useful packing sleeve is composed of a thermoplastic material such as polyethylene foam) which contains a plurality of longitudinally-directed slits. Such slits allow the sleeve to expand to accommodate produce items having a nominal diameter larger than the non-expanded diameter of the sleeve. The natural resiliency of the thermoplastic material enables the sleeve to form a relatively snug fit about the items. Such sleeves are especially useful in the packaging of tomatoes, apples, peaches, pears, asian pears, kiwis, papayas, and mangos.

The expandable thermoplastic packing sleeves of the prior art are not effective, however, for produce items having a diameter only slightly larger than the non-expanded diameter of the packing sleeve. Such items of produce tend to fall out of the packing sleeve. This is because the packing sleeves of the prior art are expandable at both ends. Unless the items of produce are markedly larger than the non-expanded diameter of the packing sleeve (so that the sleeve fits very tightly), the items of produce will fall out of the packing sleeve.

There is therefore a need for an expandable packing sleeve which will have a greater tendency to retain packaged items than do packing sleeves of the prior art.

There is also a need for such a packing sleeve which is easy to install and inexpensive to manufacture.

SUMMARY OF THE INVENTION

The invention satisfies these needs. The invention is a packing sleeve having an open inlet end, an opposed open retaining end, and a longitudinally extended body therebetween A substantial portion of the body has a plurality of slits circumferentially spaced around the body so that the inlet end and a substantial portion of the body are radially expandable to accommodate a product having a circumference larger than the non-expanded circumference of the packing sleeve. The retaining end of the packing sleeve is substantially non-expandable however so as to prevent products having a circumference larger than the non-expanded circumference of the retaining end from falling through the retaining end as well as to protect the bottom portion of the produce.

The invention provides an effective and inexpensive method for protecting small, fragile items such as fruits and vegetables. Unlike prior art packing sleeves, the packing sleeve of the invention will not allow a fragile item of product to fall out of the packing sleeve through the retaining end.

DRAWINGS

FIG. 3 is a prospective view of a partially expanded packing sleeve such as the one shown in FIG. 1;

FIG. 4 is a side view of a second packing sleeve embodying features of the invention, the packing sleeve being shown as it may be used to retain spherical items.

DESCRIPTION

Figure 1:
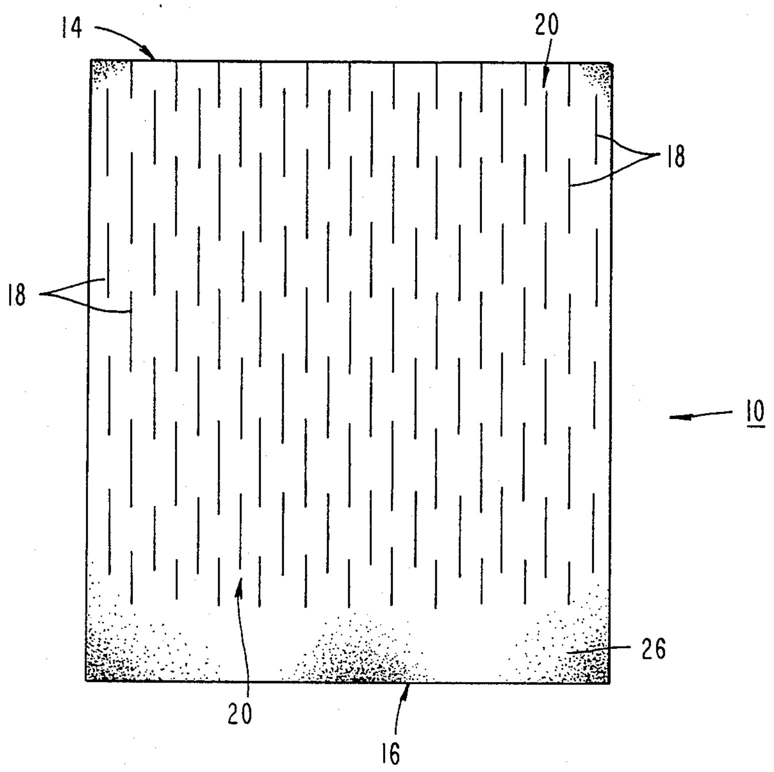
FIG. 1 is a side view of a packing sleeve embodying features of the invention, the packing sleeve being shown in its non-expanded state.
Figure 2:
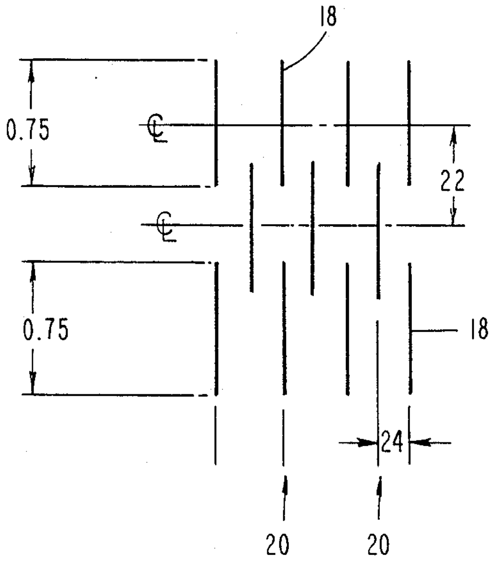
FIG. 2 is a detail drawing showing a slit pattern useful in the invention.

Referring to the drawings, the invention is a unique packing sleeve shown generally as packing sleeve 10. The packing sleeve 10 comprises a tubular body 12 having an open inlet end 14 and an open retaining end 16.

The packing sleeve 10 is composed of a flexible sheet material which is sufficiently tear-resistant for the desired packing use. Sheet plastic materials are particularly suitable. Thermoplastic materials such as thermoplastic polyethylene foam polypropylene foam, flexible polystyrene foam and natural or synthetic foam rubbers are preferred because of their inherent "cushioning" properties. Thermoplastic polyethylene foam is particularly desirable because it is inexpensive and because it is readily severable and heat-sealable.

The sheet material comprising the body 12 can be of any convenient thickness. Sheets having a thickness between about 1/16th inch and about ½ inch are typically suitable for the packaging of fruits and vegetables.

The body 12 can be of any desired length. Lengths between about 3 inches and about 8 inches are suitable for packing most fruits and vegetables. Also, the body 12 can be of any desired diameter. Diameters between about 1 inch and about 8 inches are generally suitable for packing most fruits and vegetables.

The body 12 defines a plurality of slits 18, each of which preferably penetrates the wall of the body 12.

The slits 18 are made in the body 12 in such a way that the body 12 is expandable in one or more directions. For most purposes, it is preferable that the slits 18 are made in the body 12 so that the body 12 is radially expandable. Toward this end, it is preferable that the slits are made in the body 12 such that each slit 18 is generally parallel to the longitudinal axis of the body 12.

Although the slits 18 may be made in the body 12 in a random pattern, it is generally preferable that the slits 18 be made in the body 12 in a predetermined pattern. A predetermined pattern provides a predictable degree of expansion capability within the body 12. Any predetermined pattern may be used which provides a suitable degree of expansion in the direction desired. Examples of various patterns suitable in the invention are provided in U.S. Pat. Nos. 3,040,966, 3,245,606, 3,495,764, 3,781,183, 3,843,485, and 4,503,561, each of which is incorporated herein by reference A preferred predetermined slit pattern is shown in FIGS. 1-4 wherein the slits 18 are straight, elongate, and substantially equal in length. The slits 18 are in parallel straight rows 20 with adjacent slits in each row 20 being spaced apart a distance less than about one-half the length of each slit 18 and with the staggered relation of slits 18 in an adjacent row being such that an adjacent parallel slit 18 equally overlaps the adjacent slits 18. This predetermined pattern combines strength, tear resistance and radial expandability.

The rows 20 are disposed radially about the tubular body 12. Depending upon the application, the rows may be disposed about the entire circumference of the body 12 or they may be disposed in one or more arcs of the circumference. The embodiments shown in FIGS. 1, 3 and 4, illustrate the use of rows 20 which fully circumscribe the circumference of the body 12. This embodiment imparts maximum radial expandability to the body 12.

The length of the slits 18, the spacing between the slits 18 in any row 20, and the spacing between the rows 20 are variable, depending upon the packing use contemplated. A typical pattern shown in FIG. 2, has a slit length of about 0.75 inches, a distance between slit center lines (shown as longitudinal distance 22 in FIG. 2) of about 0.5 inches and a distance between rows 20 shown as lateral distance 24 in FIG. 2) of about 0.125 inches.

Bodies 12, useful in the invention, have an expandability of between about 10% and about 100%. That is, the ratio of the diameter of the body 12 when expanded maximally compared to the diameter of the body 12 when unexpanded is between about 0.1 and about 1.0. Bodies made from polyethylene foam material having a slit length of about 0.75 inches, a longitudinal distance 22 of about 0.5 inches and a lateral distance 24 of about 0.125 inches have an expandability between about 10% and about 110% of the unexpanded diameter.

The retaining end 16 of the body 12 is substantially non-expandable. This can be accomplished by defining a retaining collar 26 disposed radially about the body 12 at the retaining end 16. The retaining collar 26 can be of a material separate from the body 12, in which case the retaining collar 26 is firmly affixed radially about the body 12 to substantially prevent radial expansion of the body 12. Preferably, the retaining collar 26 is a radial ring defined in the body 12 at the retaining end 16, the retaining collar 26 being a ring of the body 12 which is substantially free of slits 18 or other perforations.

The width of the retaining collar 26 can be any width suitable for the packing use contemplated. Typically, the width of the retaining collar 26 is between about ¼ inch and about 3 inches. Preferably, the width of the retaining collar 26 is between about ½ and about 3 inches.

The packing sleeve 10 of the invention can be conveniently used to cushion fruits and vegetables having a diameter greater than the unexpanded diameter of the packing sleeve 10. The body 12 is expanded by stretching the body 12 perpendicular to the slit rows 20. The article of fruit or the vegetable is inserted through the inlet end 14 of the packing sleeve 10. The body 12 is thus released, allowing the body 12 to contract, thereby forming a snug fit about the article of fruit or vegetable. The article of fruit or vegetable is restricted from falling through the retaining end 16 by the retaining collar 26. FIG. 4 illustrates the packing sleeve 10 in its expanded state.

The packing sleeve 10 of the invention can be manufactured using techniques available in the prior art. U.S. Pat. No. 3,843,485, for example, discloses a method for manufacturing thermoplastic tubes having longitudinal slits wherein the body 12 is formed from two aligned strips of thermoplastic material which are heat-sealed along the longitudinal edges. The slits 18 are formed in the body 12 using knives of an appropriate width.

Preferably, packing sleeve 10 is manufactured using the novel machine shown in FIGS. 5-12. The machine 30 comprises a flanged roll 32, a first draw roll stand 34, a rotary die station 36, a sealing knife 38 a sealing tube 40 a second draw roll stand 42 and a speed-up roll stand 44.

The flanged roll 32, first draw roll stand 34, rotary die station 36, sealing knife 38, sealing tube 40, second draw roll stand 42 and speed-up roll stand 44 are serially aligned in a straight line to form a linear web path (having a center line 46) along which a web of thermoplastic material can be drawn and processed.

The flanged roll 32 is a free-wheeling roller having a longitudinal width approximately as wide as the web 48 of thermoplastic material. The roller is flanged at both ends by a first flange 50 and a second flange 52.

The first draw roll stand 34 comprises a first draw roll stand upper roller 54 and first draw roll stand lower roller 56. The first draw roll stand upper roller 54 is adapted to rotated about a first draw roll stand upper roller shaft 58, and the first draw roll stand lower roller is adapted to rotate about a first draw roll stand lower roller shaft 60. The first draw roll upper roller shaft 58 is disposed above and in parallel with the first draw roll stand lower roller shaft 60. Both the first draw roll stand upper roller shaft 54 and the first draw roll stand lower roller shaft 60 are aligned in the same vertical plane, which vertical plane is perpendicular to the web path. The first draw roll stand upper rollers 54 and 56 are supported by suitable bearings and are adjustable spaced apart by approximately the thickness of the thermoplastic web. The first draw roll stand upper roller 54 and the first draw roll stand lower roller 56 are geared together in such a way that, when one of the rollers rotates in one direction, the other roller rotates in the opposite direction at the same roller circumference velocity (in terms, for example, of inches of circumference travelled per minute). Preferably, both rollers are covered with neoprene or other similar material to minimize pressure and frictional damage to the web 48.

The rotary die station 36 comprises a die roller 62 and an anvil roller 64. The die roller 62 is adapted to rotate about a die roller shaft 66 and the anvil roller 64 is adapted to rotate about an anvil roller shaft 68. The die roller shaft 66 is disposed above and in parallel with the anvil roller shaft 68. Both the die roller shaft 66 and the anvil roller shaft 68 are aligned in the same vertical plane, which vertical plane is perpendicular to the web path. The die roller 62 and the anvil roller 64 are both supported by suitable bearings and are adjustably spaced apart by approximately the thickness of the thermoplastic web 48. The die roller 62 and the anvil roller 64 are geared together in such a way that when one of the rollers rotates in one direction, the other roller rotates in the opposite direction at the same roller circumference velocity (in terms, for example, of inches of circumference travelled per minute).

Figures 6, 7, 8:
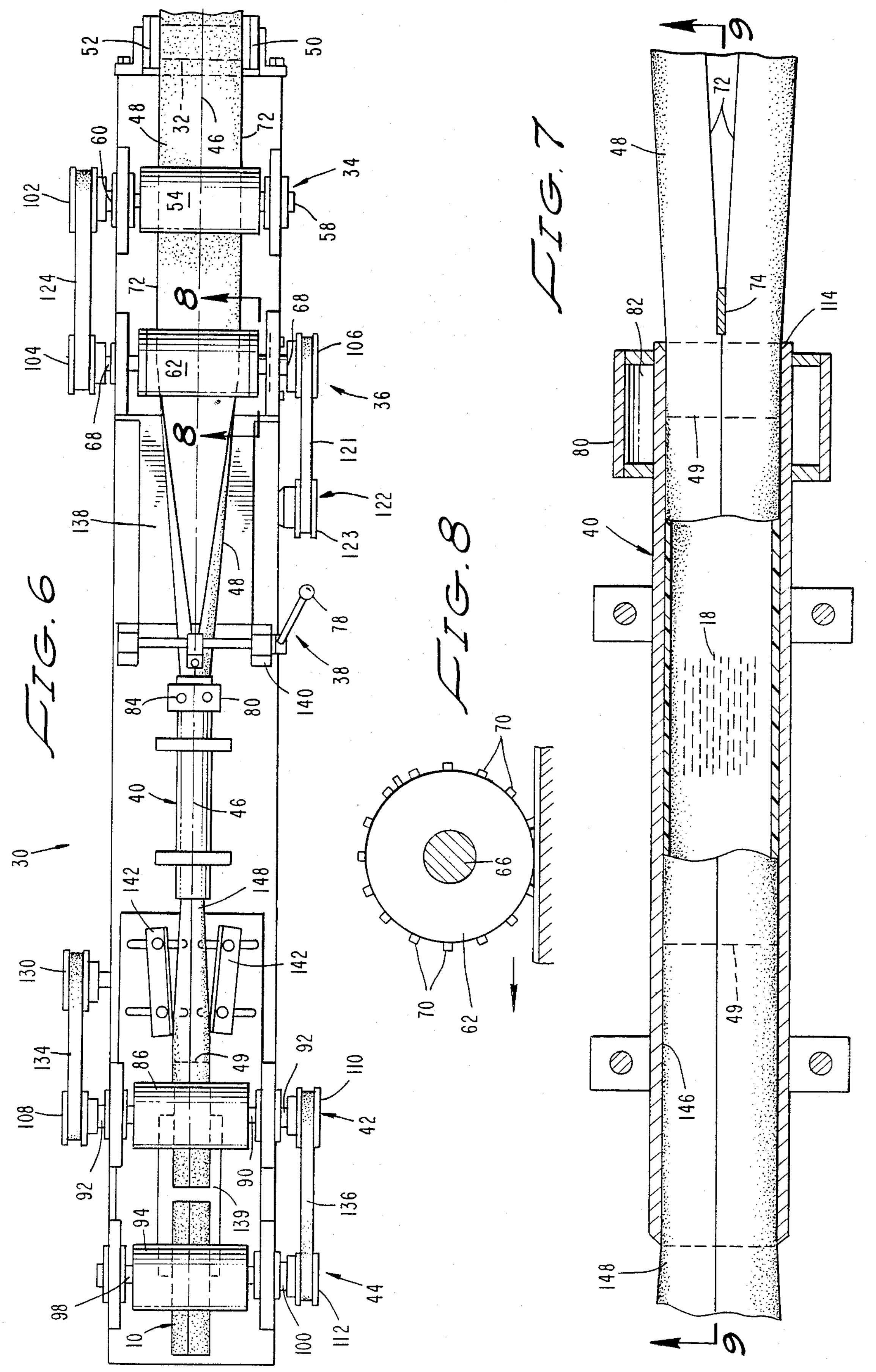
FIG. 6 is a top view of the machine shown in FIG. 5.
FIG. 7 is a partial cross-section of the top of the sealing tube element of the machine shown in FIG. 5.
FIG. 8 is a side view of the die roller element of the machine shown in FIG. 5.
Figures 9, 10, 11, 12:
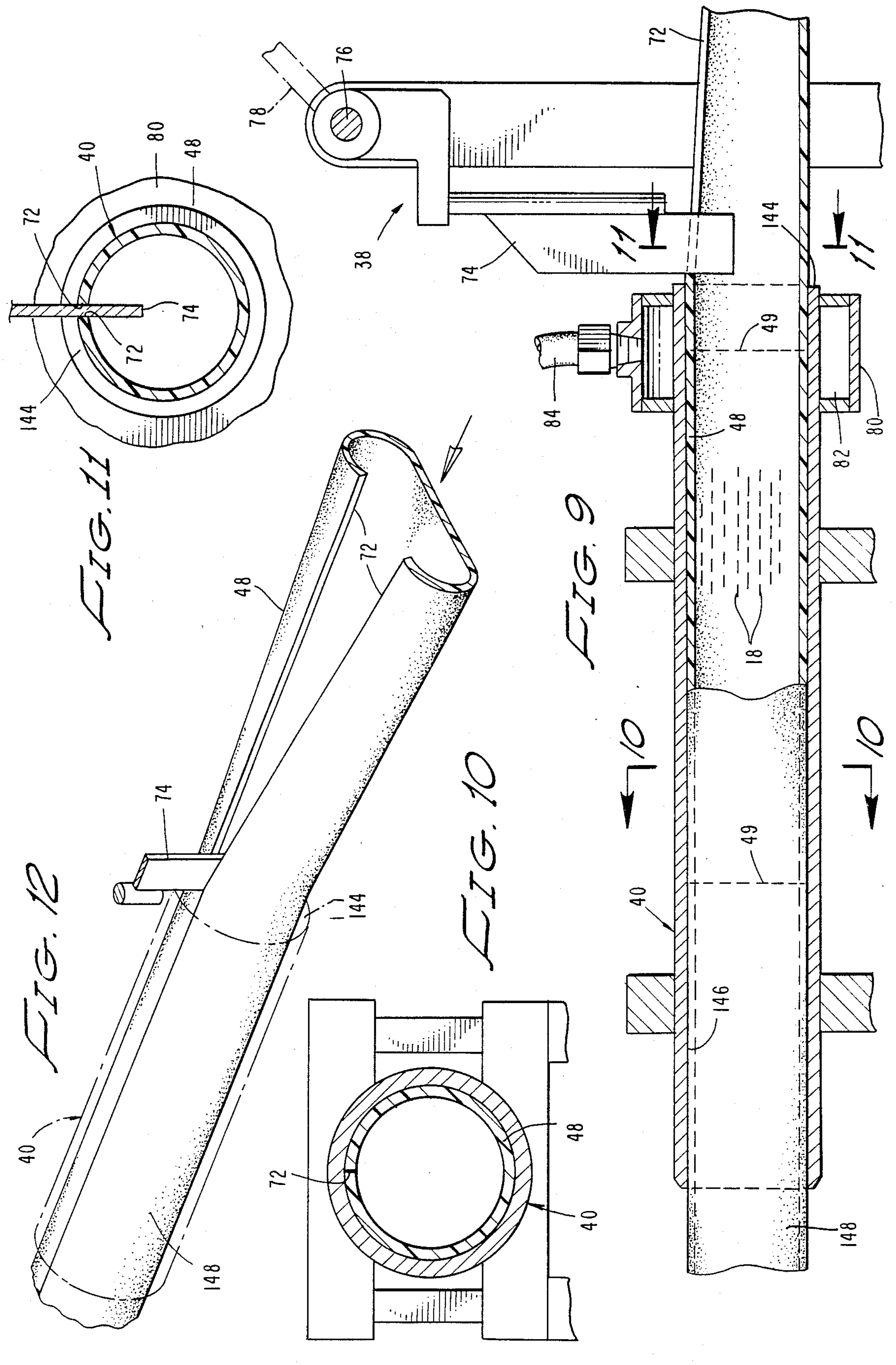
FIG. 9 is a partial cross-section of the side of the sealing tube shown in FIG. 7.
FIG. 10 is a cross-sectional view of the sealing tube element shown in FIG. 9.
FIG. 11 is a cross-sectional view of the sealing knife element of the machine shown in FIG. 5.
FIG. 12 is a perspective view of a sealing knife element useful in the machine shown in FIG. 5.

As shown in FIG. 8, the die roller 62 comprises a plurality of knife projections 70 disposed in a precise pattern. The anvil roller 64 is adapted with a plurality of slits (not shown) which are disposed in the same precise pattern as the knife projections 70 such that when the die roller 62 and the anvil roller 64 rotate in opposite directions, each of the knife projections 70 meshes with one of the anvil roller slits.

The precise pattern of the knife projections 70 is calculated to produce in a strip of thermoplastic material 48 passing between the die roller 62 and the anvil roller 64 the desired pattern of slits 18. Optionally, the pattern of knife projections 70 can also be adapted to produce in a strip of thermoplastic material 48 passing between the die and anvil rollers 62 and 64 periodic lines of perforations 49 extending laterally between the two longitudinal edges 72 of the strip of thermoplastic material 48.

Figure 5:
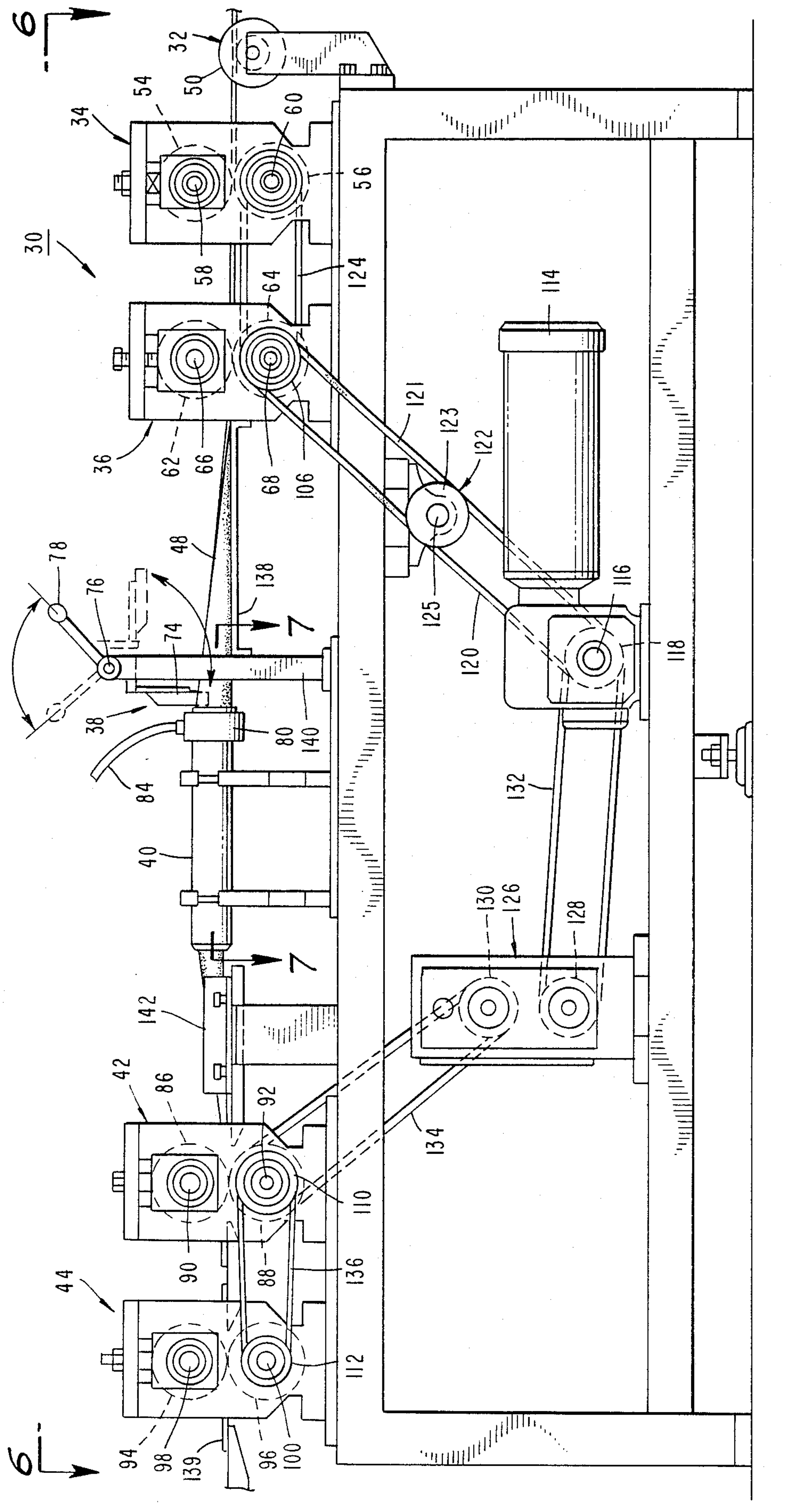
FIG. 5 is a side view of machine useful for making the invention.

The sealing knife 38 comprises a heated blade 74 which is aligned in a normal operating position along the center line 46 of the web path such that the heated blade 74 is aligned in a vertical plane, which vertical plane is disposed in parallel with the web path. As shown in FIG. 5, the sealing knife can be adapted to rotate about a sealing knife axis 76, using a sealing knife handle 78 between the normal operating position (shown in FIG. 6 in solid lines) and a machine-setup position (shown in FIG. 6 in broken lines).

The sealing knife 38 is a melting means which can be electrically heated to a temperature capable of melting the longitudinal edges 72 of the web 48 when the web 48 is drawn in contact past the sealing knife 38.

The sealing tube 40 is a hollow, open-ended right circular cylinder whose inside diameter is the same as the desired outside diameter of the finished packing sleeve 10. The sealing tube 40 is disposed with its longitudinal axis parallel with the center line 46 of the web path.

Optionally, a chill ring 80 can be disposed about the inlet end of the ceiling tube. The chill ring 80 comprises a fluid-tight chamber 82 disposed circumferentially around the sealing tube 40. The chill ring 80 is adapted for water or some other coolant to be circulated through the chill ring 80 via suitable hose or piping connections 84.

The second draw roll stand 42 comprises a second draw roll stand upper roller 86 and a second draw roll stand lower roller 88. The second draw roll stand upper roller 86 is adapted to rotate about a second draw roll stand upper roller shaft 90, and the second draw roll stand lower roller 88 is adapted to rotate about a second draw roll stand lower roller shaft 92. The second draw roll stand upper roller axis is disposed above and in parallel with the second draw roll stand lower roller shaft 92. Both the second draw roll stand upper roller shaft 90 and the second draw stand lower roller shaft 92 are aligned in the same vertical plane, which vertical plane is perpendicular to the webbed path. The second draw roll stand upper and lower rollers 86 and 88 are supported by suitable bearings and are adjustably spaced apart by approximately the thickness of the thermoplastic web 48.

The second draw roll stand upper roller 86 and the second draw roll stand lower roller 88 are geared together in such a way that when one of the rollers rotates in one direction, the other roller rotates in the opposite direction at the same roller circumference velocity (in terms, for example, of inches of circumference travelled per minute). Preferably, both rollers are covered with neoprene or other similar material to minimize pressure and frictional damages to the web 48.

The speed-up roll stand 44 comprises a speed-up roll stand upper roller 94 and a speed-up roll stand lower roller 96. The speed-up roll stand upper roller 94 is adapted to rotate about a speed-up roller stand upper roller shaft 98, and the speed-up roll stand lower roller 96 is adapted to rotate about a speed-up roll stand lower roller shaft 100. The speed-up roll stand upper roller shaft 98 is disposed above and in parallel with the speed-up roller stand lower roller shaft 100. Both the speed-up roll stand upper roller shaft 98 and the speed-up roll stand lower roller shaft 100 are aligned in the same vertical plane, which vertical plane is perpendicular to the web path. The speed-up roll stand upper and lower rollers 94 and 96 are supported by suitable bearings and are adjustably spaced apart by approximately the thickness of the thermoplastic web 48.

The speed-up roll stand upper roller 94 and the speed-up roll stand lower roller 96 are geared together in such a way that, when one of the rollers rotates in one direction, the other roller rotates in the opposite direction at the same roller circumference velocity in terms for example of inches of circumference travelled per minute). Preferably, both rollers are covered with neoprene or other similar material to minimize pressure and frictional damage to the web 48.

The first draw roll stand 34, the rotary die station 36 and the second draw roll stand 42 act in concert to provide a means for drawing the strip of thermoplastic material 48 from a take off roll (not shown), through the rotary die station 36 where the strip 48 is perforated, past the sealing knife 38 where the longitudinal edges 72 of the strip of thermoplastic material 48 are melted and into and through the sealing tube 40 where the melted longitudinal edges 72 of the thermoplastic material 48 are caused to come together, cooled and joined together.

A first draw roll stand lower roller pulley 102 is attached to a first end of the first draw roll stand lower shaft 60 in such a way that such pulley 102 rotates about such shaft 60. A first anvil roller pulley 104 is attached to a first end of the anvil roller shaft 68 in such a way that such pulley 104 rotates about such shaft 68. A second anvil roller pulley 106 is attached to the second end of the anvil roller shaft 68 in such a way that such pulley 106 rotates about such shaft 68.

A second draw roll stand lower roller first pulley 108 is attached to a first end of the second draw roll stand lower roller shaft 92 in such a Way that such pulley 108 rotates about such shaft 92, A second draw roll stand lower roller second pulley 110 is attached to the second end of the second draw roll stand lower roller shaft 92 in such a Way that such pulley 110 rotates about such shaft 92. A speed-up roll stand lower roller pulley 112 is attached to a first end of the speed-up roll stand lower roller shaft 100 in such a way that such pulley 112 rotates about such shaft 100.

The machine 30 is powered by a drive motor 114 which turns a main drive shaft 116. A first drive pulley 118 is disposed on one side of the drive shaft 116 and a second main drive pulley (not shown) is disposed on the opposite end of the drive shaft 116. The first main drive pulley 118 is linked to the rotary die station 36 by a first main drive belt 120 and a second main drive belt 121 via a drive countershaft 122. The drive countershaft 122 is comprised of a first countershaft pulley 123 and a second countershaft pulley (not shown) rotatably affixed to a countershaft axle 125. The first main drive belt 120 is disposed under tension about the first main drive pulley 118 and the first countershaft pulley 123. The second main drive belt 121 is disposed under tension about the second countershaft pulley and the second anvil roller pulley 106. As shown in FIG. 6, a first timing belt drive 124 is disposed under tension around the first anvil roller pulley 104 and the draw roll stand lower roller pulley 102.

Power is also transmitted from the drive motor 114 to the second roll stand 42 via a p.i.v. 126. The p.i.v. 126 comprises a first pulley 128 and a second pulley 130 adjustably geared together by suitable gearing. A second drive belt 132 is disposed under tension about the second main drive pulley and the first p.i.v. pulley 128. The second p.i.v. pulley 130 is connected to the second draw roll stand lower roller first pulley 108 by a p.i.v. timing belt 134 which is disposed under tension between the second p.i.v. pulley 130 and the second draw roll stand lower roller first pulley 108.

A speed-up section timing belt drive 136 is disposed under tension about the second draw roll stand lower roller second pulley 110 and the speed-up roll stand lower roller pulley 112.

Additional components can be used in the machine 30 as deemed suitable by one of ordinary skill in the art. For example, in the drawings, tables 138 and 139 are shown disposed horizontally along the web path between the rotary die station 36 and the framework 140 holding the sealing knife 38 and between the second draw roll station 42 and the speed-up roll station 44, respectively. Also, alignment fences 142 are shown in FIGS. 5 and 6 disposed along the web path between the sealing tube 40 and the second draw roll stand 42. The alignment fences 142 can comprise two short pieces of channel and are adapted to direct the Web 48 as it exists the sealing tube 40 into the second draw roll stand 42.

In operation, the web 48 of the thermoplastic material, comprising a strip of thermoplastic material having a width which is the same as the desired circumference of the packing sleeve 10, is drawn across the flanged roll 32, between the first draw roll stand upper and lower rollers, 54 and 56 between the die and anvil rollers 62 and 64, across the table 138, past the sealing knife 38, into the sealing tube 40, between the alignment fences 142, between the second draw roll stand upper and lower rollers 86 and 88 and between the speed-up roll stand upper and lower rollers 94 and 96.

The distance between the first draw roll stand upper and lower rollers 54 and 56 is adjusted to gently grip the web 48 and draw it across the flanged roll 32.

The first draw roll stand upper and lower rollers 54 and 56 are geared to turn in unison in opposite directions to draw the web 48 between them. The die roller 62 and the anvil roller 64 are similarly geared to rotate in unison in opposite directions to further draw the web 48 through the rotary die station 36. The speeds of the die roller 62 and anvil roller 64 is controlled by the rotational speed of the first main drive belt 120 as driven by the first main drive pulley 118. The rotational speeds of the rollers 54 and 56 in the first draw roll stand 34 and the rollers 62 and 64 in the rotary die stand 36 are the same because the anvil roller 64 and the first draw roll station lower roller 56 are linked by the first timing belt drive 124.

As the web 48 passes between the die roller 62 and the anvil roller 64, the knife projections 70 on the die roller 62 penetrate the web 48, thereby producing in the web slits 18 and, optionally, produce the lateral lines of perforations 49.

The distance between the second draw roll stand upper and lower rollers 86 and 88 is adjusted to gently grip the web 48. The second draw roll stand upper and lower rollers 86 and 88 are rotated at the same speed and in opposite directions to draw the web 48 from the rotary die station 36 past the sealing knife 38 and through the sealing tube 40. The speed at which the rollers 86 and 88 in the second draw roll stand 42 rotate is independently controlled by adjustments in the p.i.v. 126. The speed of the second draw roll stand rollers 86 and 88 is carefully controlled to exert an optimum tension on the web 48.

The sealing knife 38 is heated to a temperature calculated to melt the longitudinal edges 72 of the web 48 as the web 48 passes the sealing knife 38. By way of example, when the web 48 is traveling along the web path at about 40 feet per minute, the temperature of the sealing knife 38 is between about 375° and about 550° F.

As the web 48 enters the sealing tube 40, it is caused to follow the sides of the sealing tube 40 into a cylindrical shape. As the web longitudinal edges 72 pass by the sealing knife 38 which is disposed proximate to the inlet end 144 of the sealing tube 40, the longitudinal edges 72 of the web 48 are melted. As the web 48 continues into the sealing tube 40, the web longitudinal edges 72 are turned radially and caused to contact one another. The longitudinal edges 72 are held in abutment to one another by the inside surface 146 of the sealing tube 40. As the melted web longitudinal edges 72 cool, they fuse with one another, forming a solid cylindrical tube 148.

The cooling of the heated web longitudinal edges 72 in the sealing tube 40 is facilitated by the use of the chill ring 80. A coolant, such as water at about 55° F., is circulated through the chill ring 80 to cool the inlet end 144 of the sealing tube 40.

As the web 48 exits the sealing tube 40, it is directed to the second draw roll stand 42 by the alignment fences 142.

The distance between the speed-up roll stand upper and lower rollers 94 and 96 is adjusted so that the rollers gently grip the web 48 therebetween. The speed-up roll stand upper and lower rollers 94 and 96 are caused to rotate in unison in opposite directions to draw the web 48 between the speed-up roll stand upper and lower rollers 94 and 96 as the web 48 exits the second draw roll stand 42. The speed-up roll stand rollers 94 and 96 rotate at a slightly faster rate than do the rollers 86 and 88 of the second draw roll stand 42 (e.g. about 5% faster) so that an additional pulling force is applied to the web 48 between the second draw roll stand 42 and the speed-up roll stand 44. This additional pressure causes the web 48 to break along the laterally perforated lines 49 disposed periodically along the web 48, thereby producing individual packing sleeves 10 of a predetermined length.

Although the present invention has been described in considerable detail with reference to certain preferred versions, many other versions should be apparent to those skilled in the art. Therefore, the spirit and scope of the appended claims should not necessarily be limited to the description of the preferred versions contained herein.

What is claimed is:

1. A packing sleeve for protectively packaging products such as produce, the sleeve having an open inlet end, an opposed open retaining end, and a longitudinally extending body therebetween, a substantial portion of the body having a plurality of slits circumferentially spaced around the body so that the inlet end and a substantial portion of the body are radially expandable to accommodate a product having a circumference larger than the non-expanded circumference of the packing sleeve, the retaining end of the packing sleeve being substantially non-expandable so as to prevent products having a circumference larger than the non-expanded circumference of the retaining end from falling through the retaining end.

2. The packing sleeve defined in claim 1 wherein the slits extend generally longitudinally with respect to the body.

3. The packing sleeve defined in claim 1 wherein the body defines a retaining collar at the retaining end; the retaining collar being substantially free of slits so that it is substantially non-expandable.

4. The packing sleeve defined in claim 3 wherein the retaining collar is at least about ¼ inch wide.

5. The packing sleeve defined in claim 3 wherein the width of the retaining collar is between about ¼ inch and about 3 inches.

6. The packing sleeve defined in claim 1 wherein the slits are disposed in a plurality of rows.

7. The packing sleeve of claim 6 wherein the rows of slits are substantially parallel.

8. The packing sleeve defined in claim 6 wherein the rows of slits are disposed substantially parallel with the longitudinal axis of the packing sleeve.

9. The packing sleeve defined in claim 7 wherein the slits and adjacent rows are offset in the lengthwise direction of the rows and the slits in alternate rows are approximately aligned in a direction transverse to the rows.

10. The packing sleeve defined in claim 9 wherein the slits and adjacent rows are offset in the lengthwise direction of the rows a distance such that the center of each slit is located approximately opposite the center of the distance between the slits in each of the two adjacent slit rows.

11. The packing sleeve defined in claim 1 wherein the body is composed of a thermoplastic material having a thickness between about 1/16 inch and about ½ inch.

12. The sleeve defined in claim 1 wherein the body is composed of a thermoplastic material having a thickness between about 0.1 inches and about 0.3 inches.

13. The packing sleeve defined in claim 1 wherein the ratio of the diameter of the body when expanded to its maximum as compared to the width of the body when unexpanded is between about 0.1 and about 1.

14. The packing sleeve defined in claim 1 wherein the ratio of the diameter of the body when expanded to its maximum as compared to the width of the body when unexpanded is between about 1.5 and about 2.5.

15. A packing sleeve for protectably packaging products such as produce, the packing sleeve having an open inlet end, an opposed open retaining end, and a longitudinally extending body therebetween; a substantial portion of the body having a plurality of longitudinally extending slits spaced circumferentially around the body in a plurality of rows extending lengthwise; the rows between substantially parallel to the longitudinal axis of the body; the slits in adjacent rows being offset in the lengthwise direction of the rows and the slits in alternate rows being approximately aligned in a direction transverse to the rows; the slits in adjacent rows being offset in the lengthwise direction of the rows a distance such that the center of a slit in any row is located approximately opposite the center of the longitudinal distance between adjacent slits in each of the adjacent rows; wherein substantially no slits exist within the body proximate to the retaining end of the packing sleeve.

* * * * *